United States Patent Office 3,046,014
Patented July 24, 1962

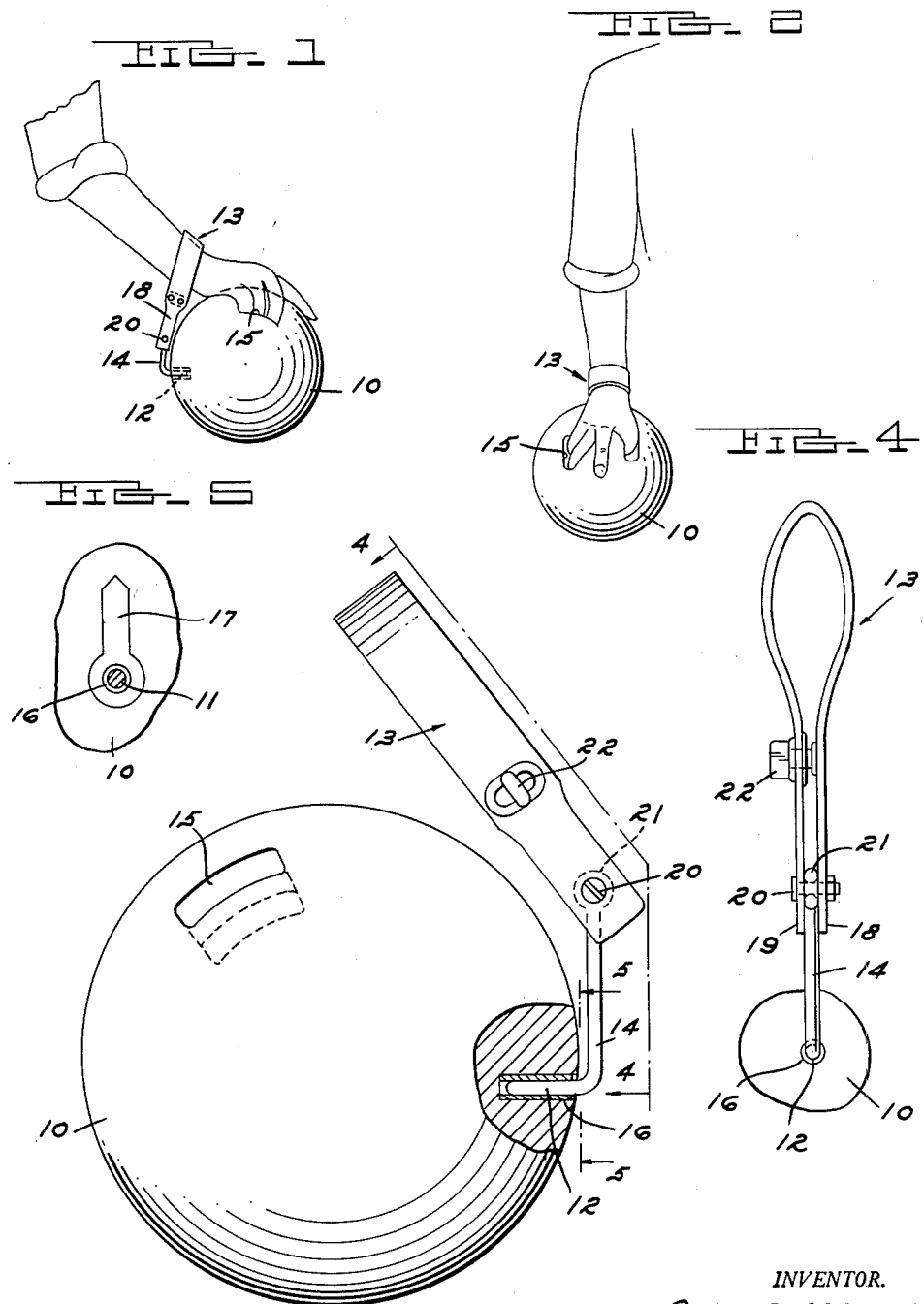

3,046,014
BOWLING BALL WRIST HANGER AND AUTOMATIC RELEASE
Cesare Abruzzi, 30740 Eleven Mile Road, Farmington, Mich.
Filed June 12, 1961, Ser. No. 116,348
3 Claims. (Cl. 273—64)

This invention relates to a bowler's auxiliary support for holding and propelling a bowling ball.

Auxiliary supports for bowling balls have been employed heretofore to facilitate providing more of a hand hold than a finger grip relative to the weight of the heavy ball, however, the several devices of the prior art have not proven entirely satisfactory inasmuch as they are complicated in design and construction, expensive to manufacture, difficult to use, and not positive in supporting and releasing the ball.

With the foregoing in view, the primary object of the invention is to provide an auxiliary support for bowlers for holding and propelling a bowling ball which is simple in design and construction, inexpensive to manufacture, easy to use, and positive in locking and releasing the ball.

An object of the invention is to provide a support which places the major weight of the ball on the bowler's wrist rather than on the hand or fingers.

An object of the invention is to provide a small socket in the ball disposed substantially on a radius for receiving a connecting prong.

An object of the invention is to provide a prong insertable in the ball socket and a link connecting to the prong at one end and a wrist band at the other end so that when in the use position tangential force is placed on the prong locking same in the socket thereby supporting the ball.

An object of the invention is to provide the spacing between the finger holes, socket, prong, link, and wrist band so that upon the user placing the prong in the ball socket and gripping the ball in the holes that the prong is cocked in the socket with the link exerting tangential force thereon locking the prong in the socket and supporting the weight of the ball.

An object of the invention is to integrate the auxiliary supporting device so that upon release of the ball by the bowler, the tangential force on the prong locking the prong in the ball socket is released and an axial force developed extracting the prong from the socket thereby automatically releasing the ball.

An object of the invention is to provide a swivel connection between the wrist band and the link to assist in converting the tangential force to an axial force relative to the prong.

These and other objects of the invention will become apparent by reference to the following description of an auxiliary support for bowlers embodying the invention taken in connection with the accompanying drawing in which:

FIG. 1 is a side elevational view of a bowling ball and auxiliary support in the use position showing the bowlers arm.

FIG. 2 is a face elevational view taken from the right of FIG. 1.

FIG. 3 is an enlarged side view similar to FIG. 1, partly in cross-section, showing the auxiliary support and ball in more detail.

FIG. 4 is a rear elevational view of the auxiliary support taken on the line 4—4 of FIG. 5 with the ball portion being broken away; and FIG. 5 is a partial view of the ball showing the socket area.

Referring now to the drawing wherein like numerals refer to like and corresponding parts throughout the several views, the auxiliary support for bowlers disclosed therein to illustrate the invention comprises, a bowling ball 10 having a prong receiving socket 11 enveloping the prong 12 which is connected to the wrist band 13 by the link 14 with the prong being adapted to support the major weight of the ball 10 via the link 14 and wrist band 13 when cocked in the use position seen in FIGS. 1 and 2 by inserting the bowler's fingers in the finger holes 15.

More particularly, the ball 10 is equipped with a tubular insert 16 disposed on a radius of the ball comprising the socket 11 receiving the prong 12 and it will be noted that tangential force on the prong 12 locks the prong 12 in the tube 16 whereas axial force on the prong 12 moves the prong 12 axially out relative to the tubular socket 16. The indicating arrow 17 may be painted or inlaid in the ball peripheral surface to indicate the direction of positioning the link 14 and wrist band 13 for inserting the fingers in the ball apertures to properly intergrate the device for bowling.

The wrist band 13 comprises a reversely looped leather strap having paired adjacent ends 18 and 19 through which the bolt 20 is disposed through the eye 21 on the link 14 thereby pivotally inter-connecting the link 14 with the wrist band 13. The wrist band 13 is expandable by releasing the clasp 22 for inserting and extracting the bowler's hand and, upon user placing the band 13 on his wrist, he fastens the clasp 22 thereby securing the band on his wrist.

The finger holes 15 have been shown as slots, however, it is to be understood that same can be formed with the usual finger and thumb apertures if desired, however it has been found that a bowling ball with slots as shown for the fingers is more universally adaptable between several persons having different size hands and wrists than one with finger holes. In a custom fitted ball for a certain person it is preferable to have finger holes in conjunction with the supporting device with the spacing between the socket 16 and the other parts being custom co-ordinated for the one particular bowler.

In operation, the bowler releases the clasp 22 and places the wrist band 13 on his wrist and then fastens the clasp 22 thereby securely mounting the wrist band 13 on his wrist. He then inserts the prong 12 in the ball socket 16 and then cocks the ball back to the position seen in FIGS. 1 and 2 with his other hand and inserts his fingers in the holes 15 thereby locking the ball between his fingers on one end the prong 12 and the wrist band 13 on the other end so as to throw the major weight of the ball upon the prong 12 and wrist band 13 via the link 14. In this position it will be noted that the pull of the link 14 on the prong 12 is substantially at right angles thereto so as to place a tangential force on the prong 12 cocking it in the socket 16 thereby locking it in the socket to support the weight of the ball. Upon bowling the ball, the user releases his fingers from the finger holes 15 whereupon the ball rolls forwardly from the position seen in FIG. 1 transferring and releasing the tangential direction of the force on the prong 12 and converting it to an axially directed force relative to the prong 12 so as to extract the prong 12 from the socket 16 effecting a release between the supporting device and the ball upon the release of the ball by the bowler in propelling the ball down the alley.

The inventive device is found particularly suitable and useful with persons having relatively weak fingers such as children, the aged, and invalids who desire to bowl but who can not properly hold and grip the heavy bowling ball with only their fingers as compared to a person having relatively strong fingers.

The inventive auxiliary support for bowlers with the features described constitutes a compact, durable, neat appearing mechanism easily transported and operated relative to supporting the ball on the wrist.

Although but a single embodiment of the invention has been shown and described in detail, it is obvious that many changes may be made in the size, shape, detail, and arrangement of the various elements of the invention within the scope of the appended claims; for example, the clasp 22 may be deleted and a chain or cord interposed between the wrist band 13 and the prong 12.

I claim:

1. An automatically releasing auxiliary support for holding and impelling a bowling ball particularly suitable for use by persons having relatively weak fingers such as children, the aged, and invalids, comprising a bowling ball having a peripheral surface, finger holes, and a substantially radial aperture penetrating its peripheral surface constituting a socket for receiving a prong; a prong freely disposed in said ball socket, a link connected to said prong at a right angle thereto, and a wrist band connected to said link; said ball finger holes and socket aperture being spaced apart and said wrist band, link, and prong being so dimensioned relative to said spacing and relative to the size of the user's hand that the ball is suspended on the user's wrist with the fingers cocking the ball relative to said prong, link, and wrist band so that tangential force is applied to said prong locking said prong in said socket and supporting the ball thereon; said ball upon release uncocking relative to said tangential force applied on said prong so as to permit said prong to unlock in said socket and move axially outwardly effecting an automatic disconnection therebetween.

2. An automatically releasing auxiliary support for holding and propelling a bowling ball particularly suitable for use by persons having relatively weak fingers such as children, the aged, and invalids, comprising a bowling ball having a peripheral surface, finger holes, and a substantially radial aperture penetrating its peripheral surface constituting a socket for receiving a prong; a prong freely disposed in said ball socket, a link connected to said prong adapted to lie at an angle thereto, and a wrist band connected to said link; said ball finger holes and socket aperture being spaced apart and said wrist band, link, and prong being so dimensioned relative to said spacing and relative to the size of the user's hand that the ball is mainly suspended on the user's wrist with the fingers cocking the ball relative to said prong, link, and wrist band so that tangential force is applied to said prong locking said prong in said socket and supporting the ball thereon; said ball upon release uncocking relative to said tangential force applied on said prong so as to permit said prong to unlock in said socket and move axially outwardly effecting an automatic disconnection therebetween.

3. An automatically releasing auxiliary support for holding and propelling a bowling ball particularly suitable for use by persons having relatively weak fingers such as children, the aged, and invalids, wherein a bowling ball has a peripheral surface, finger holes, and a substantially radial aperture penetrating its peripheral surface constituting a socket for receiving a prong and wherein the support comprises a prong axially insertable in the ball socket, a link connected to said prong adapted to lie at an angle thereto, and a wrist band connected to said link; the ball finger holes and socket aperture being spaced apart and said wrist band, link, and prong being so dimensioned relative to the ball hole spacing and relative to the size of the user's hand that the ball is suspendible on the user's wrist with the fingers cocking the ball relative to said prong, link, and wrist band so that tangential force is applied to said prong locking said prong in the socket and supporting the ball thereon; the ball upon release uncocking relative to said tangential force applied on said prong so as to permit said prong to unlock in said socket and move axially outwardly effecting an automatic disconnection therebetween.

References Cited in the file of this patent

UNITED STATES PATENTS

| 459,933 | Leppert | Sept. 22, 1891 |
| 1,068,389 | Hyatt | July 22, 1913 |
| 2,482,395 | Zander | Sept. 20, 1949 |